Patented Oct. 24, 1950

2,526,865

UNITED STATES PATENT OFFICE 2,526,865

STABILIZED FAT COMPOSITIONS

Paul Gyorgy, Villanova, Pa., assignor to Wyeth Incorporated, Philadelphia, Pa., a corporation of Delaware No Drawing. Application October 26, 1946, Serial No. 706,044

8 Claims. (Cl. 99—163)

1

This invention relates to the stabilization of fat-type compositions against deleterious oxidative changes and relates in particular to fat-type food compositions stabilized by the presence of a small amount of a synergistic antioxygenic combination composed of an hydroxychroman compound such as alpha-tocopherol and a crude source of the vitamin B complex containing at least potentially an antioxygenic substance.

It is a well known fact that oils, fats, and foodstuffs containing unsaturated glycerides often become rancid, which in the case of edible products renders them unfit for human consumption. This difficulty is especially true in the case of oils and fats that have been subjected to refining or processing operations, or which are stored for an appreciable time before being used.

One object of the instant invention is to hinder oxidative changes in liquid fat-type foodstuffs, such as milk, during processing to a more concentrated state.

Another object of the invention is to provide an antioxygenic synergistic combination, part of the antioxygenic activity of which is supplied by a crude source of the vitamin B complex, and part by vitamin E or a substance closely related thereto.

Another object of the invention is to furnish a relatively cheap and practical means of stabilizing fat-type foodstuffs particularly fats and oils containing unsaturated glycerides.

Another object of the invention is to provide a stabilized foodstuff without changing the normal appearance, taste, or flavor characteristics of the treated product.

I have found the above objectives are all accomplished by incorporating into fat-type compositions a small amount of a synergistic antioxygenic combination of an hydroxychroman compound such as alpha-tocopherol and a crude source of the vitamin B complex containing at least potentially an antioxygenic substance, which alone has relatively slight antioxygenic effect. The term hydroxychroman is intended to include both saturated and unsaturated hydroxy benzopyrans. Thus I may utilize instead of alpha-tocopherol, beta-tocopherol, gamma tocopherol or mixtures thereof; the alkyltocols such as 5,7 dimethyl tocol; the chromens such as 6-hydroxychromen and 2,2,4-trimethyl-6-hydroxychromen; the hydroxycoumarans, such as 5-hydroxycoumaran and 2,4,6,7-tetramethyl 5 hydroxycoumaran and the chroman-5,6-quinones and their precursors which are associated with vitamin E. As the crude source of the vitamin B complex, I prefer

2 a rice bran concentrate or an extract thereof prepared via either an aqueous, aqueous alcoholic or chloroform extraction or a chromatographic procedure. One may, however, substitute other crude sources of vitamin B complex provided they contain synergistic antioxygenic activity with hydroxychromans such as alpha-tocopherol.

The following Table I serves to illustrate specifically the synergistic antioxygenic activity of a crude source of the vitamin B complex, such as rice bran concentrate, with alpha-tocopherol. In determining the data set forth in the table, a modified dried system was used composed of 18 grams of corn starch, 3.5 grams of redistilled linoleic acid, and different percentages of alpha-tocopherol and crude sources of the vitamin B complex as indicated. The various ingredients were thoroughly mixed and incubated at 30° C. Representative aliquot samples were taken at the intervals indicated in the table and the fat was extracted with chloroform and the iodine number determined. For all practical purposes the iodine number of the linoleic acid in this system never falls below about 50 so that in general, measurements were no longer taken when values of about 50 were reached. It will be noted that in the case of both the control wherein no antioxidant was added, and the 2.5% rice bran concentrate alone, an iodine value of about 50 is reached in 7 days.

Table I

| Antioxidant Mixture | Conc., Per Cent | Iodine Number | |
|---|---|---|---|
| | | 7 Days | 13 Days |
| Control (no antioxidant) | | 50.4 | |
| Rice Bran Concentrate | 2.5 | 58.2 | |
| Alpha-tocopherol | .03 | 90.2 | 41.7 |
| Rice Bran Concentrate plus Alpha-tocopherol | 2.5 .03 | 126.8 | 51.9 |

It will be noted that rice bran concentrate alone at the level indicated in Table I was substantially ineffective to stabilize linoleic acid since approximately the same iodine number as the control was obtained. On the other hand, the addition of this ineffective agent to alpha-tocopherol resulted in a high antioxidative protection to linoleic acid.

The effect of tocopherol and rice bran extract on the time required for the oxidative destruction of carotene in linoleic acid was taken as a measure of synergistic antioxidant activity. 1 ml. of a linoleic acid solution of carotene and tocopherol was pipetted into a number of 10 ml. Erlenmeyer flasks, carefully selected for uniformity of size. When rice bran extract was tested, 1 ml. of the extract was pipetted into the flask already containing the oil and the two solutions mixed by gently swirling the flask. The groups of flasks were then placed in the incubator at 30°; every day one flask from each group was removed and the carotene content determined. The contents of the flask were washed with approximately 10 ml. of petroleum ether into a separatory funnel, 20 ml. of alcoholic KOH were added to give a clear solution, 20 ml. of $H_2O$ were added, the mixture was shaken, and then, after separation into two layers, the water-alcohol solution was discarded. This procedure removed linoleic acid and oxidation products which interfered with the carotene determination. Carotene was determined in the proper dilution of the petroleum ether fraction by measurement of light transmission at 450, 460, 475, and 490 m$\mu$ with the Beckman spectrophotometer. The concentration of carotene was calculated by reference to standard curves. Rancidification of the linoleic acid was checked by determination of the peroxide number by known methods.

Table II illustrates the effect of tocopherol and rice bran extract on the preservation of carotene in linoleic acid.

Table II

| | Material Tested | 50% Carotene Destruction, in hours |
|---|---|---|
| 1 | 35 microg. carotene and 1 ml. linoleic acid (control). | Approx. 12. |
| 2 | 1 plus 1 ml. Rice Bran Extract | Approx. 12. |
| 3 | 1 plus 2 mg. mixed Tocopherols | Approx. 48. |
| 4 | 3 plus 1 ml. Rice Bran Extract | Over 192. |

The determination of peroxide values on a similar set of samples correlates carotene destruction with oxidation of the linoleic acid. Table III illustrates the stabilization of linoleic acid by the synergistic action of rice bran concentrate and mixed tocopherols.

Table III

| | Material Tested | Peroxide Number at indicated days | | | | | |
|---|---|---|---|---|---|---|---|
| | | 1 | 3 | 5 | 8 | 10 | 12 |
| 1 | 35 microg. carotene and 1 ml. linoleic acid | 33.5 | 145 | 390 | | | |
| 2 | 1 plus 1 ml. Rice Bran Concentrate | 33.6 | 147 | 387 | | | |
| 3 | 1 plus 2 mg. mixed Tocopherols | 6.3 | 12 | 20 | 75 | 415 | |
| 4 | 3 plus 1 ml. Rice Bran concentrate | 5.7 | 11 | 14 | 10 | 12 | 20 |

Tables IV and V illustrate the synergistic activity of rice bran concentrate and tocopherols on the stabilization of oleaginous material other than linoleic acid.

Table IV

| Flask No. | Sample in 50 ml. Erlenmeyer flask | Per cent carotene retained at 30° C. | | | |
|---|---|---|---|---|---|
| | | 3 days | 8 days | 11 days | 13 days |
| 1 | 10 ml. cottonseed oil solution of carotene 4.5 mg. per gram. | 77.4 | 1.0 | | |
| 2 | 1 plus 5 ml. rice bran extract | 88.5 | 20.7 | 1.0 | |
| 3 | 1 plus mixed tocopherols, 4.5 mg. per gram. | 93.1 | 34.4 | 9.4 | 2.1 |
| 4 | 3 plus 5 ml. rice bran extract | 90.4 | 59.7 | 49.0 | 43.0 |

Table V

| Flask No. | Sample in 50 ml. Erlenmeyer flask | Per cent carotene retained at 30° C. | | |
|---|---|---|---|---|
| | | 3 days | 10 days | 21 days |
| 1 | 10 ml. soy bean oil solution of carotene, 4.5 mg. per gram. | 70.5 | 1.1 | |
| 2 | 1 plus 5 ml. rice bran extract | 82.0 | 17.8 | 1.1 |
| 3 | 1 plus mixed tocopherols, 4.5 mg. per gram | 76.2 | 9.4 | |
| 4 | 3 plus 5 ml. rice bran extract | 90.3 | 41.8 | 4.5 |

A study of the tables clearly demonstrates the synergism present in the combination of rice bran concentrate or extract together with a hydroxychroman compound. Noting Table II, for example, an extremely high protection was afforded the mixture of carotene and linoleic acid which is unpredictable from the demonstrated effects of rice bran concentrate or tocopherol alone. In Table III, the peroxide numbers for the control and the rice bran concentrate greatly increased after only 1 day. Moreover, the addition of tocopherol to carotene and linoleic acid proved ineffective at about 8 days. However, the combination of rice bran concentrate and tocopherols demonstrated high protection even after 12 days. Tables IV and V show that the new antioxidant combination is effective with oleaginous materials other than linoleic acid. In Table IV while carotene was substantially completely destroyed at the 13 day period using either rice bran concentrate or tocopherols, the mixture of both at the end of this period resulted in retaining almost 50% carotene content. Table V likewise demonstrates the synergistic activity of the combination of rice bran concentrate and tocopherols since a much higher percentage of carotene is retained at the 10 and 21 day level than is retained with either one alone.

The experimental evidence shown in the tables conclusively demonstrates the activity of the new combination over the separate effects of each element alone or what could be predicted from such separate effects.

Small amounts, preferably about 2 to 10% or slightly more of the synergistic combinations of hydroxychromans with crude sources of the vitamin B complex, may be added to various foodstuffs containing a significant amount of fat to attain a definite retardation of oxidative deterioration. Thus small amounts of the combinations may be added to milk before converting the same to an almost dry state by means of spray drying or other suitable evaporative procedures. Or the combinations may be incorporated in small amounts for protective purposes in evaporated milks or in dry milks, such as skim milk powder containing milk compounds with or without added other fats. They may likewise be employed to hinder the development of rancidity in mixed fat compositions, such as one containing beef fats, cocoanut oil, cod liver oil, and partially hydrogenated soybean oil or one containing tallow, oleo oil, and soya bean oil. Butter and lard may thus be protected as well as various oils, such as cottonseed, castor, sesame, peanut, olive, teaseed, palm, cocoanut, corn, soya bean, shark, cod liver, halibut liver, mackerel, etc. Other fat containing foods to which the invention is applicable are fatty meats, such as bacon, fatty emulsions in water, such as milk, cream, ice cream, mayonnaise, nuts, coffee, etc. In all such cases I prefer the hydroxychroman constituent to be present in a concentration of about .02 to .3%.

Obviously, the odorless types of the antioxygenic combinations of the inventions may be applied advantageously to the stabilization of essential oils, such as oils of lemon, orange, peppermint, wintergreen, cloves, sassafras, etc. and creams of the vanishing, cold, shaving, and depilatory types.

Obviously also the invention is susceptible to many widely different embodiments without departing from the spirit and scope thereof, hence it is to be understood that I do not limit myself to the above description except as defined in the appended claims.

This application is a continuation-in-part of abandoned application Serial No. 537,189, filed May 24, 1944.

I claim:

1. A stabilized composition of matter comprising a substance containing a significant percentage of fats susceptible to oxidation, and an antioxidant mixture of an hydroxychroman and rice bran extract in an amount ranging from about 2 to about 10% of the entire composition, said hydroxychroman constituting from about 0.02 to about 0.3% of said mixture.

2. A stabilized composition of matter comprising a substance containing a significant percentage of fats susceptible to oxidation, and a mixture of alpha-tocopherol and rice bran extract in an amount ranging from about 2 to about 10% of the entire composition, said alpha-tocopherol constituting from about 0.02 to about 0.3% of said mixture.

3. A stabilized composition of matter comprising tallow, oleo oil, soya bean oil, and a mixture of an hydroxychroman and rice bran extract in an amount ranging from about 2 to about 10% of the entire composition, said hydroxychroman constituting from about 0.02 to about 0.3% of said mixture.

4. A stabilized composition of matter comprising milk solids, a fat susceptible to oxidation, and a mixture of an hydroxychroman and rice bran extract in an amount ranging from about 2 to about 10% of the entire composition, said hydroxychroman constituting from about 0.02 to about 0.3% of said mixture.

5. A stabilized composition of matter comprising dried milk and a mixture of an hydroxychroman and rice bran extract in an amount ranging from about 2 to about 10% of the entire composition, said hydroxychroman constituting from about 0.02 to about 0.3% of said mixture.

6. A stabilized composition of matter comprising tallow, oleo oil, soya bean oil, and a mixture of alpha-tocopherol and rice bran extract in an amount ranging from about 2 to about 10% of the entire composition, said alpha-tocopherol constituting from about 0.02 to about 0.3% of said mixture.

7. A stabilized composition of matter comprising dried milk and a mixture of alpha-tocopherol and rice bran extract in an amount ranging from about 2 to about 10% of the entire composition, said alpha-tocopherol constituting from about 0.02 to about 0.3% of said mixture.

8. A stabilized composition of matter comprising milk solids, a fat susceptible to oxidation, and a mixture of alpha-tocopherol and rice bran extract in an amount ranging from about 2 to about 10% of the entire composition, said alpha-tocopherol constituting from about 0.02 to about 0.3% of said mixture.

PAUL GYORGY.

REFERENCES CITED

The following references are of record in the file of this patent:

UNITED STATES PATENTS

| Number | Name | Date |
|---|---|---|
| 2,282,788 | Musher | May 12, 1942 |
| 2,345,571 | Briod et al. | Apr. 4, 1944 |
| 2,401,293 | Pfiffner et al. | June 4, 1946 |
| 2,407,096 | Buxton | Sept. 3, 1946 |